United States Patent
Ge et al.

(10) Patent No.: US 9,229,967 B2
(45) Date of Patent: Jan. 5, 2016

(54) EFFICIENT PROCESSING OF PATH RELATED OPERATIONS ON DATA ORGANIZED HIERARCHICALLY IN AN RDBMS

(75) Inventors: Fei Ge, Palo Alto, CA (US); Sam Idicula, San Jose, CA (US); Namit Jain, Santa Clara, CA (US); Nipun Agarwal, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1153 days.

(21) Appl. No.: 11/360,792

(22) Filed: Feb. 22, 2006

(65) Prior Publication Data

US 2007/0198545 A1    Aug. 23, 2007

(51) Int. Cl.
G06F 7/00 (2006.01)
G06F 17/30 (2006.01)

(52) U.S. Cl.
CPC .................. *G06F 17/30327* (2013.01)

(58) Field of Classification Search
None
See application file for complete search history.

(56) References Cited

U.S. PATENT DOCUMENTS

| | | | |
|---|---|---|---|
| 5,295,261 A | 3/1994 | Simonetti | |
| 5,404,513 A | 4/1995 | Powers et al. | |
| 5,467,471 A | 11/1995 | Bader | |
| 5,680,614 A | 10/1997 | Bakuya et al. | |
| 5,724,577 A | 3/1998 | Exley et al. | |
| 5,734,887 A | 3/1998 | Kingberg et al. | |
| 5,751,949 A | 5/1998 | Thomson et al. | |
| 5,787,428 A | 7/1998 | Hart | |
| 5,878,415 A | 3/1999 | Olds | |
| 5,924,088 A * | 7/1999 | Jakobsson et al. | ................ 707/2 |
| 5,974,407 A | 10/1999 | Sacks | |
| 5,987,506 A | 11/1999 | Carter et al. | |
| 6,003,040 A | 12/1999 | Mital et al. | |
| 6,038,563 A | 3/2000 | Bapat et al. | |
| 6,055,544 A | 4/2000 | DeRose et al. | |
| 6,061,684 A | 5/2000 | Glasser et al. | |
| 6,128,610 A | 10/2000 | Srinivasan et al. | |

(Continued)

FOREIGN PATENT DOCUMENTS

| | | |
|---|---|---|
| EP | 1 241589 A2 | 9/2002 |
| JP | 06-348575 | 12/1994 |

(Continued)

OTHER PUBLICATIONS

Bourret, R., et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

(Continued)

*Primary Examiner* — Apu Mofiz
*Assistant Examiner* — Thu Nga Nguyen
(74) *Attorney, Agent, or Firm* — Hickman Palermo Becker Bingham LLP; Marcel K. Bingham (57) ABSTRACT

A mechanism is used to improve the efficiency of performing resource-to-path resolution. A hierarchical link structure contains entries and/or records ("link entries") that each defines a parent-child link within an information hierarchy. A certain linking entry may have data that refers to another link entry representing a link to the parent—a link in which the parent is a child. This data allows resource-to-path resolutions to be performed more efficiently.

33 Claims, 3 Drawing Sheets

(56) References Cited

U.S. PATENT DOCUMENTS

| | | | |
|---|---|---|---|
| 6,141,655 A | 10/2000 | Johnson et al. | |
| 6,154,741 A | 11/2000 | Feldman | |
| 6,189,012 B1 | 2/2001 | Mital et al. | |
| 6,199,195 B1 | 3/2001 | Goodwin et al. | |
| 6,208,993 B1 | 3/2001 | Shadmone | |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,343,287 B1 | 1/2002 | Kumar et al. | |
| 6,356,920 B1 | 3/2002 | Vandersluis | |
| 6,366,902 B1 | 4/2002 | Lyle et al. | |
| 6,366,934 B1 | 4/2002 | Cheng et al. | |
| 6,370,537 B1 | 4/2002 | Gilbert et al. | |
| 6,381,607 B1 | 4/2002 | Wu et al. | |
| 6,427,123 B1* | 7/2002 | Sedlar | 702/2 |
| 6,470,344 B1 | 10/2002 | Kothuri et al. | |
| 6,487,546 B1 | 11/2002 | Witkowski | |
| 6,496,842 B1 | 12/2002 | Lyness | |
| 6,519,597 B1 | 2/2003 | Cheng et al. | |
| 6,539,398 B1 | 3/2003 | Hannan et al. | |
| 6,571,231 B2 | 5/2003 | Sedlar | |
| 6,581,060 B1 | 6/2003 | Choy et al. | |
| 6,604,100 B1 | 8/2003 | Fernandez et al. | |
| 6,609,121 B1 | 8/2003 | Ambrosini et al. | |
| 6,631,366 B1 | 10/2003 | Nagavamsi et al. | |
| 6,636,845 B2 | 10/2003 | Chau et al. | |
| 6,662,342 B1 | 12/2003 | Marcy | |
| 6,684,227 B2 | 1/2004 | Duxbury | |
| 6,704,739 B2 | 3/2004 | Craft et al. | |
| 6,704,747 B1 | 3/2004 | Fong | |
| 6,708,186 B1 | 3/2004 | Claborn et al. | |
| 6,718,322 B1 | 4/2004 | Brye | |
| 6,725,212 B2 | 4/2004 | Couch et al. | |
| 6,754,661 B1 | 6/2004 | Hallin et al. | |
| 6,772,350 B1 | 8/2004 | Belani et al. | |
| 6,785,673 B1 | 8/2004 | Fernandez et al. | |
| 6,801,224 B1 | 10/2004 | Lewallen | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,882,627 B2* | 4/2005 | Pieda et al. | 370/248 |
| 6,920,457 B2 | 7/2005 | Pressmar | |
| 6,964,025 B2 | 11/2005 | Angiulo et al. | |
| 6,965,894 B2 | 11/2005 | Leung et al. | |
| 7,031,956 B1 | 4/2006 | Lee et al. | |
| 7,043,488 B1 | 5/2006 | Bauer et al. | |
| 7,089,239 B1 | 8/2006 | Baer et al. | |
| 7,200,595 B2 | 4/2007 | Dutta et al. | |
| 7,472,140 B2 | 12/2008 | Agarwal et al. | |
| 7,533,136 B2 | 5/2009 | Idicula et al. | |
| 7,543,004 B2 | 6/2009 | Idicula et al. | |
| 2001/0051946 A1* | 12/2001 | Nishikawa | 707/100 |
| 2002/0056025 A1 | 5/2002 | Qiu et al. | |
| 2002/0073019 A1 | 6/2002 | Deaton | |
| 2002/0095421 A1* | 7/2002 | Koskas | 707/100 |
| 2002/0116371 A1 | 8/2002 | Dodds et al. | |
| 2002/0116457 A1 | 8/2002 | Eshleman et al. | |
| 2002/0133484 A1 | 9/2002 | Chau et al. | |
| 2002/0143512 A1 | 10/2002 | Shamoto et al. | |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2003/0004937 A1 | 1/2003 | Salmenkaita et al. | |
| 2003/0009361 A1 | 1/2003 | Hancock et al. | |
| 2003/0018618 A1 | 1/2003 | Bestgen et al. | |
| 2003/0033285 A1* | 2/2003 | Jalali et al. | 707/1 |
| 2003/0065659 A1* | 4/2003 | Agarwal et al. | 707/4 |
| 2003/0078906 A1 | 4/2003 | Ten-Hove et al. | |
| 2003/0093672 A1 | 5/2003 | Cichowlas | |
| 2003/0101169 A1 | 5/2003 | Bhatt et al. | |
| 2003/0101194 A1 | 5/2003 | Rys et al. | |
| 2003/0172135 A1 | 9/2003 | Bobick et al. | |
| 2003/0182624 A1 | 9/2003 | Large | |
| 2003/0212662 A1 | 11/2003 | Shin et al. | |
| 2004/0043758 A1 | 3/2004 | Sorvari et al. | |
| 2004/0064466 A1 | 4/2004 | Manikutty et al. | |
| 2004/0073541 A1 | 4/2004 | Lindblad et al. | |
| 2004/0083222 A1* | 4/2004 | Pecherer | 707/100 |
| 2004/0088306 A1* | 5/2004 | Murthy et al. | 707/100 |
| 2004/0103105 A1* | 5/2004 | Lindblad et al. | 707/100 |
| 2004/0148278 A1 | 7/2004 | Milo et al. | |
| 2004/0176958 A1 | 9/2004 | Salmenkaita et al. | |
| 2004/0220912 A1 | 11/2004 | Manikutty et al. | |
| 2004/0225680 A1 | 11/2004 | Cameron et al. | |
| 2004/0230667 A1 | 11/2004 | Wookey | |
| 2004/0267760 A1 | 12/2004 | Brundage et al. | |
| 2005/0050058 A1 | 3/2005 | Jain et al. | |
| 2005/0050092 A1 | 3/2005 | Jain et al. | |
| 2005/0091188 A1 | 4/2005 | Pal et al. | |
| 2005/0097108 A1* | 5/2005 | Wang et al. | 707/100 |
| 2005/0120031 A1 | 6/2005 | Ishii | |
| 2005/0216465 A1 | 9/2005 | Dutta et al. | |
| 2005/0228792 A1 | 10/2005 | Chandrasekaran et al. | |
| 2005/0229158 A1 | 10/2005 | Thusoo et al. | |
| 2005/0289125 A1 | 12/2005 | Liu et al. | |
| 2006/0101003 A1* | 5/2006 | Carson et al. | 707/3 |
| 2006/0101320 A1 | 5/2006 | Dodds et al. | |
| 2006/0129584 A1 | 6/2006 | Hoang et al. | |
| 2006/0161591 A1* | 7/2006 | Huang et al. | 707/200 |
| 2007/0011167 A1 | 1/2007 | Krishnaprasad et al. | |

FOREIGN PATENT DOCUMENTS

| | | |
|---|---|---|
| JP | 10-111833 | 4/1998 |
| WO | WO 00/49533 A2 | 8/2000 |
| WO | WO 0049533 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

Braga, Daniele et al., "A Graphical Environment to Query XML Data with Query," Proceedings of the Fourth International Conference on Web Information Systems Engineering (WISE '03), 2003, IEEE, 10 pages.

Chae, Mi-Ok, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Chakraborty, Krishnendu, "The XML Garbage Collector", The Source for Developers, Sun Developer Network Site XP-002297849, Mar. 2002.

Chen, Ruey-Shun et al., "Developing an XML framework for metadata system", Trinity College Dublin, Proc. of the 1st Inter. Sympo. on Information and Communication, pp. 267-272.

Cheng, Josephine et al., "IBM DB2 XML Extender," IEEE, ICDE '00 Conference, San Diego, Feb. 2000, 128 pages.

Cooper, Brian F. et al., "A Fast Index for Semistructured Data ," Proceeding of the International Conference on Very Large Databases, 2001, XP-002303292, pp. 341-350.

Lo et al., "XAS: A System for Accessing Componentized, Virtual XML Documents," IEEE, 2001, pp. 493-502.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

McHugh, Jason, et al. "Indexing Semistructured Data," Stanford Science Department, 1998, XP-002248313, pp. 1-21.

McHugh, Jason et al., "Query Optimization for XML", XP-002333353, *Proceedings of the 25th VLDB Conference* (1999) pp. 315-326.

Myllymaki, Jussi, "Effective Wed data Extraction with Standard XML Technologies," WWW10, May 1-5, 2001, pp. 689-696.

Noser, Hansrudi, et al., "Dynamic 3D Visualization of Database-Defined Tree Structures on the WWW by Using Rewriting Systems," 2000, IEEE, XP-002262516, pp. 247-254.

(56) References Cited

OTHER PUBLICATIONS

Peng, Feng et al., "XPath queries on streaming data" (2003) *ACM Press*, pp. 431-442.

Schmidt et al., "Why and How to Benchmark XML Databases," SIGMOND Record, vol. 3, No. 3, Sep. 2001, pp. 27-32.

Vion-Dury, Jean-Yves, "XPath on left and right sides of rules: toward compact XML tree rewriting through node patterns" (2003) *ACM Press*, pp. 19-25.

Vorthmann, S. et al. "Beyond Schemas, Schema Adjuncts and the Outside World," Markup Languages, Online!, vol. 2, No. 3, Jun. 2000, pp. 1-8.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

Zisman et al., "Using XML to Build Consistency Rules for Distributed Specifications," Proceedings of the Tenth International Workshop on Software Specification and Design (IWSD'00), IEEE 2000, 8 pages.

Jurgens, Marcus, et al., "PISA: Performance Models for Index Structures with and without Aggregated data", German Research Society, 1999, 7 pages.

Pal, Shankar et al., "Indexing XML Data Stored in a Relational Database", Proceedings of the 30$^{th}$ VLDB Conference, 2004, 12 pages.

European Patent Office, "Patent Cooperation Treaty", Application No. PCT/US2007/067747, dated Jun. 11, 2008, 6 pages.

Garcia-Molina, Hector, et al., "Database System Implementation", Prentice Hall, Department of Computer Science Stanford University, 2000, 27 pages.

Rizvi et al., "Extending Query Rewriting techniques for fine-grained access control", SIGMOD 2004, ACM, 12 pages.

Japanese Patent Office, "Notice of Grounds of Rejection", Foreign patent application No. 533164/2003, mailed Jul. 22, 2008, 3 pages.

Idicula, S. et al., U.S. Appl. No. 11/304,414, filed Dec. 14, 2005 (22 pages).

Communication from Indian Application No. 00558/KOLNP/04 dated Sep. 18, 2009 (2 pages).

Current claims from Indian Application No. 00558/KOLNP/04, Nov. 2009 (5 pages).

Office Action from Canadian Application No. 2,461,871 dated Dec. 30, 2010 (5 pages).

Current claims from Canadian Application No. 2,461,871 dated Dec. 2010 (4 pages).

D2: Jajodia, S. et al. "Toward a Multilevel Secure Relational Data Model" IEEE, 1995 (33 pages).

\* cited by examiner

| RROWID | NODE ID | NODE DATA |
|--------|---------|-----------|
| R1 | 1 | D1 |
| R2 | 2 | D2 |
| R3 | 3 | D3 |
| R4 | 4 | D4 |
| R5 | 5 | D5 |
| R6 | 6 | D6 |
| R7 | 7 | D7 |

250

| LROWID | PARENT RID | CHILD RID | CHILD NAME | ACCESS INFO | PARENT LID |
|--------|------------|-----------|------------|-------------|------------|
| L1 |  | R1 | a | RW |  |
| L2 | R1 | R2 | b | RW | L1 |
| L3 | R1 | R3 | c | RW | L1 |
| L4 | R2 | R4 | d | RW | L2 |
| L5 | R2 | R5 | e | R | L2, L8 |
| L6 | R3 | R6 | f | R | L3 |
| L7 | R3 | R7 | g | R | L3 |
| L8 | R6 | R2 | b | R | L6 |

FIG. 3

EFFICIENT PROCESSING OF PATH RELATED OPERATIONS ON DATA ORGANIZED HIERARCHICALLY IN AN RDBMS

RELATED APPLICATION SECTION

The present application is related to the following applications.

U.S. patent application Ser. No. 10/260,138, filed on Sep. 27, 2002, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge, incorporated herein by reference.

U.S. patent application Ser. No. 10/256,524, filed on Sep. 27, 2002, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali, incorporated herein by reference.

U.S. patent application Ser. No. 10/259,176, filed on Sep. 27, 2002, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya, incorporated herein by reference.

U.S. patent application Ser. No. 10/260,381, filed on Sep. 27, 2002, entitled MECHANISM TO EFFICIENTLY INDEX STRUCTURED DATA THAT PROVIDES HIERARCHICAL ACCESS IN A RELATIONAL DATABASE by Neema Jalali, Eric Sedlar, Nipun Agarwal, and Ravi Murthy, incorporated herein by reference.

FIELD OF THE INVENTION

The present invention relates to managing hierarchical information, and in particular, accessing hierarchical information more efficiently.

BACKGROUND

The approaches described in the BACKGROUND section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional computer file systems, for example, are typically implemented using hierarchy-based organization principles. For example, a typical file system has directories arranged in a hierarchy, and documents stored in the directories.

Figure 1:
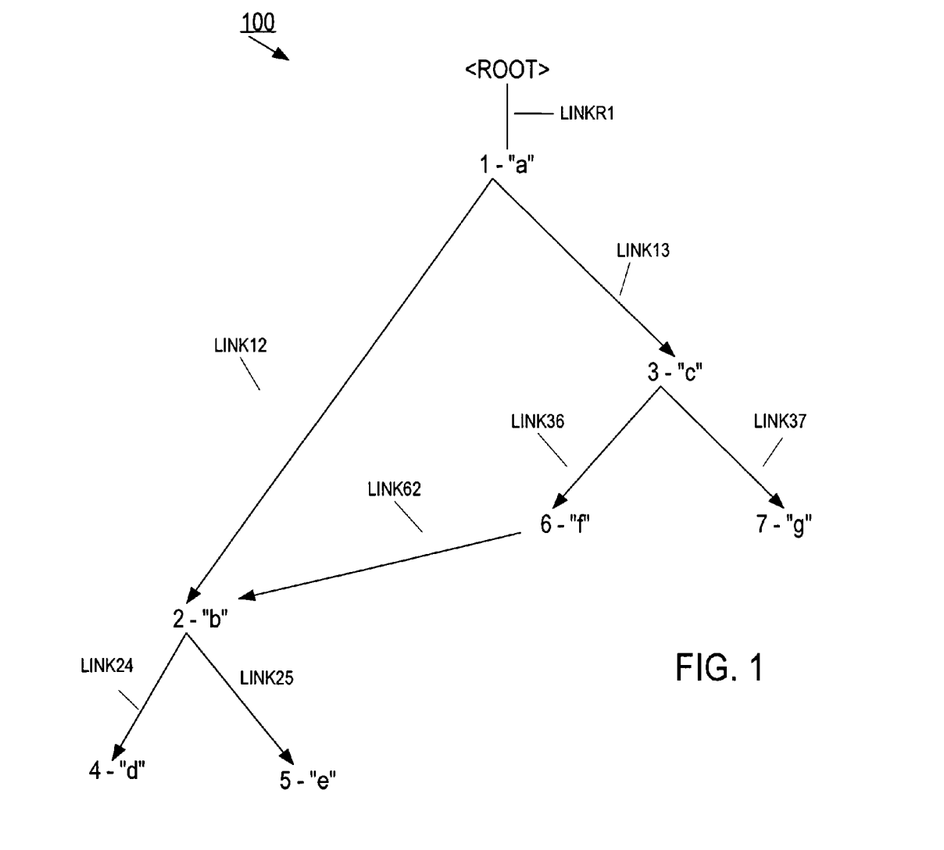
FIG. 1 is a directed graph representing nodes in an information hierarchy according to an embodiment of the present invention.

Information arranged in a hierarchy is referred to herein as an information hierarchy. An information hierarchy can be represented as a hierarchy of nodes. FIG. 1 is a directed graph that illustrates an information hierarchy 100. Information hierarchy 100 includes eight nodes. The highest node in the hierarchy is referred to as the "root" node. The nodes at the end of each branch in the hierarchy are "leaf" nodes. The nodes between the root node and the leaf nodes are "intermediate" nodes. In the illustrated hierarchy, nodes 1, 2, 3 and 6 are intermediate nodes, and nodes 4, 5 and 7 are leaf nodes.

In an information hierarchy, the nodes correspond to information. Typically, the piece of information associated with each node has some form of name and some type of content. Node 1 has the name a, node 2 has the name b, node 3 has the name c, and so forth.

In an information hierarchy that corresponds to a hierarchical file system, the nodes typically correspond to files or directories. Each file has a name and some form of content. Each directory has a name and content in the form of zero or more files.

A node is said to have a parent-child relationship with any node that is an immediate descendant of the node in the information hierarchy. The parent-child relationship between a particular parent node and child node is also referred to herein as a parent-child link or just simply link. In FIG. 1, directed edges between nodes represent parent-child links; edges go from the parent node to the child node. Thus, the root node has a link LINKR1 to node 1. Node 1 has a link LINK12 to node 2 and a link LINK13 to node 3. Node 2 has links LINK24 and LINK25 to nodes 4 and 5, respectively. Node 3 has links LINK36 and LINK37 to nodes 6 and 7, respectively.

In some information hierarchies, a child node may have multiple parents. Node 2 is not only a child of node 1 but also of node 6, and therefore not only has a link from parent node 1 but also has LINK6 from parent node 6.

Paths and Path Levels and Pathnames

Each node in an information hierarchy may be located by following a "path" through the hierarchy to the node. The path to a "target" node begins at the root node and proceeds down the hierarchy of nodes to eventually arrive at the target node. For example, the path to node 6 consists of nodes root, 1, 3 and 6.

Each node in the path corresponds to a path level. The number of levels in a path is the number of nodes in the path. Thus, the path to node 6 has four levels. The root corresponds to the first level, node 1 to the second level, node 3 to the third level and node 6 to the fourth level.

As mentioned before, a node may have more than one parent. Further, in some types of information hierarchies, nodes may have the same name. To unambiguously identify a given node, more than just the name of the node may be required. A convenient way to identify a specific node and/or its location within an information hierarchy is through the use of a "pathname". A pathname is a concise way of uniquely identifying a node based on the path through the hierarchy to the node. A pathname may be composed of a sequence of names of nodes in the path. One way to represent a pathname is separate the node names by a delimiter. Often, a '/' is used to delimit the names of nodes in the path. A leading '/' refers to the root. The pathname that identifies node 6 is '/a/c/f'. Standards for paths and pathnames are described in, for example, *XQuery 1.0 and Xpath 2.0 Data Model*, W3C Working Draft, 29 Oct. 2004, which is incorporated herein by reference.

Relational Database Versus a Hierarchical System

In contrast to a hierarchical file system, in a relational database information is stored in tables comprised of rows and columns. Each row is identified by a unique row id. Each column represents an attribute or field of a record, and each row represents a particular record. Data is retrieved from the database by submitting queries to a database server that manages the database. The queries must conform to the database language supported by the database server. Structured Query Language (SQL) is an example of a database language supported by many existing database management systems.

Each type of storage approach has advantages and limitations. A hierarchical file system is simple, intuitive, and easy to implement, and is a standard model used by many application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system. However, the process of formulating and submitting queries to a database server is less intuitive than merely traversing a hierarchy of directories, and is beyond the technical comfort level of many computer users.

Hierarchically organized systems and relationally organized systems have been implemented in different ways that were not compatible. However, a relational database system can be enhanced to incorporate features that allow them to emulate a hierarchically organized system. Such database systems are referred to herein as hierarchically enhanced database systems. Hierarchically enhanced database systems may store many kinds information hierarchies, including a file hierarchy, a hierarchy of XML documents, or even a hierarchy of objects. A node within an information hierarchy stored in a hierarchically enhanced database system is referred to herein as a resource. A resource may be, for example and without limitation, a file, an XML document, or a directory that holds either files or XML documents.

Database queries issued to a hierarchically enhanced database system may request data based on a path. Computing such queries may require two important kinds of path resolution operations. A path-to-resource resolution entails determining, given a path and/or path name, what resource or resources are located within a path or identified by the pathname. A resource-to-path resolution entails determining, given a resource, what path or paths a resource is located within and/or whether a resource is within a given path.

Hierarchically-enhanced database systems have been optimized to perform path-to-resource resolution but not resource-to-path resolution. Therefore, there is a need for a mechanism to more efficiently perform resource-to-path resolution.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is a mechanism that may be used to improve the efficiency of performing resource-to-path resolution. A set of data structures is used to represent an information hierarchy. The set of data structures includes a hierarchical link structure. A hierarchical link structure contains entries and/or records ("link entries") that each defines a parent-child link within an information hierarchy. A link structure may represent more than one information hierarchy. A given link entry may have data that refers to another link entry representing a "parent link entry", which, by definition, is a link in which a parent of the given link entry is a child. Storing such data in the link entries allows resource-to-path resolutions to be performed more efficiently.

Illustrative Structures Representing an Information Hierarchy

Figure 2:
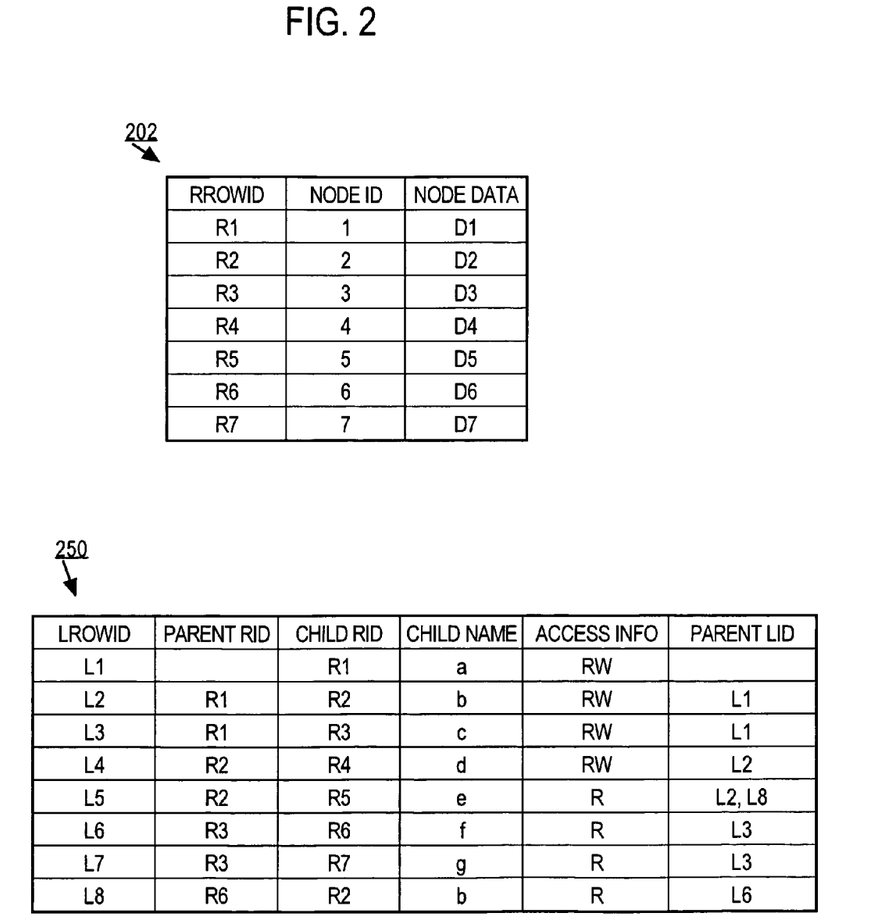
FIG. 2 is a diagram of relational structures used to represent an information hierarchy according to an embodiment of the present invention.

FIG. 2 is an example of a set of structures used within a database system to represent an information hierarchy stored in a relation or object-relational database system. Referring to FIG. 2, resource table 202 includes one row for each node in information hierarchy 100. Included in resource table 202 is a row id pseudo-column RROWID, which, logically, has row ids that identify a row in resource table 202. (Rows in resource table 202 are herein referred to by their respective row id.) Column NODE ID contains logical identifiers (herein "node ids") that uniquely identify a node in hierarchy 100. Column NODE DATA contains the data or content of a node. The row for a given node in resource table 202 includes the row's row id, a node id identifying the given node, and the data associated with the node. The node's data may reside within NODE DATA, in a structure referred to by a reference or pointer in NODE DATA, or a combination thereof. For example, row R1 corresponds to node 1, and NODE DATA contains the node's data.

For purposes of exposition, structures that represent or embody entities are referred to as those entities or as having properties of those entities. For example, stating that a row in resource table 202 is located at a particular path is just a convenient way of expressing that a resource represented by the row is located at the path. Likewise, stating that a certain row in resource table 202 is a child of another row within an information hierarchy is just a convenient way stating that the resource represented by the certain row is a child of the resource represented by the other row.

Likewise, entities represented by structures may be referred to as those structures or as having properties of those structures. For example, stating that a resource has a row id is just a convenient way of expressing that the row in resource table 202 representing the resource has a row id.

Hierarchical Link Structure

Link table 250 is a hierarchical link data structure ("link structure"). Link table 250 has link entries in the form of rows; each row defines a parent-child link in information hierarchy 100 and other information hierarchies. Column LROWID contains row ids of the link entries in link table 250.

Columns PARENT RID and CHILD RID contain resource ids. A resource id is an identifier that identifies a resource and/or a data structure representing a resource. In the case of PARENT RID and CHILD RID, the resource ids contained therein identify a row id of a resource's row within resource table 202. Column CHILD NAME contains the "child name" of the child for a particular link in hierarchy 100.

For a particular parent-child link defined by a link entry in link table 250, column PARENT RID contains a resource id that identifies the row of the parent node in resource table 202, column CHILD RID contains a resource id that identifies the row of the child node in resource table 202, and CHILD NAME contains the child name for the child of the particular parent-child link. For example, link entry L3 represents LINK13 between node 1 and 3. Accordingly, in link entry L3, the PARENT RID identifies row R1 of node 1 in resource table 202, and CHILD RID identifies row R3 of node 3 in resource table 202. The CHILD NAME contains the name c. Link entry L4 represents LINK24 between node 2 and 4. Accordingly, in link entry L4, PARENT RID identifies row R2 of node 2 and CHILD RID identifies row R4 of node 4. CHILD NAME contains the name d.

A node may have more than one parent and, accordingly, more than one link in which the node is a child. In this case, the node is identified as a child in more than one link entry. For example, link entry L2 represents LINK12 from node 1 to 2 and link entry L8 represents LINK 62 from node 6 to 2. Accordingly, there are two link entries in which node 2 is a child. In link entry L2, the PARENT RID identifies row R1 of node 1 and CHILD RID identifies row R2 of node 2. The CHILD NAME contains the name b. In link entry L8, the PARENT RID identifies row R6 of node 6 and CHILD RID identifies row R2 of node 2. The CHILD NAME contains the name b. Note that node 2 could have a different name under different links to node 2. In this case, the link entries for these links would have different name values in CHILD NAME.

Link entry L1 represents link LINKR1 between node 1 and the root. PARENT RID contains the NULL value, representing that the parent node is the root.

Parent Links

For a given parent-child link, a parent link is a link in which the parent is the child. For example, the parent link for LINK36 and LINK37 is LINK12.

In some information hierarchies in which a node may have more than one parent, a link may have more than one parent link. For example, for LINK25 the child is node 5 and the parent is node 2. There are two links in which node 2 is a child, which are LINK12 and LINK26. These are the parent links for LINK25.

To identify one or more parent links of a link entry, column PARENT LIDS contains parent link ids. A parent link id identifies a parent link and/or a data structure (e.g. link entry) representing the parent link. For a given link entry in link table 250, PARENT LIDS include a parent link id in the form of one or more row ids, each row id referring to a parent link entry that represents the parent link of the given link entry.

For example, link entry L1 represents the parent link of link entry L2. Accordingly, PARENT LIDS of link entry L2 contains L1. Link entries L2 and L8 represent the parent links of link entry L5. Accordingly, PARENT LIDS of row L5 contain L2 and L8.

Access Control Information

For each link entry in link table 250, column ACCESS INFO contains access control data for the respective link's child node. Access control data is data used to determine user access privileges, that is, what way, if any, may a user, group of users, or class of users, access the child node. Access control data may be data that explicitly specifies user access privileges, or may be data that refers to a source of access control data, or a combination thereof.

As shall be explained in greater detail, storing access data in ACCESS INFO allows access control data to obtained more efficiently when performing path resolution operations. Path resolution operations often entail determining user access privileges. As a result of storing access data in this way, path resolution operations may be performed more efficiently.

Link table 250 may be indexed by one or more indexes (not shown). For example, PARENT RID and/or a CHILD RID may be indexed by an index. Each such index enables quick access to rows representing links in which a particular resource is a parent node or a child node.

Tables 202 and 250 represent an information hierarchy in a relational format. While embodiments of the invention shall be described hereafter through the use of examples based on these relational tables, such embodiments are merely exemplary. The way a relational database system stores information about hierarchies may vary from implementation to implementation, and the present techniques are not limited to any particular implementation. For example, other structures in addition to those structures described in FIG. 2 may be used to represent an information hierarchy. Such other structures include a hierarchical index described in U.S. patent Ser. No. 10/260,381. The availability of the hierarchical index allows path-to-resource resolutions to be performed more efficiently while the availability of a link structure allows resource-to-path operations to be performed more efficiently.

Illustrative Use of Link Table

The power of a hierarchical link structure, as implemented in an embodiment, to enable more efficient execution of resource-to-path resolution is illustrated herein within the context of a illustrative query executed by a database server within a database system.

A database server is a combination of a set of integrated software components and an allocation of computational resources, such as memory and processes for executing the set of integrated software components on a processor, where the combination of software and computational resources are used for managing a database. Among other functions of database management, a database server governs and facilitates access to the database and processes requests by database clients to access the database. A database may include unstructured and structured data. Structured data is data structured according to a metadata description defining the structure. Structured data includes relational tables, object tables, object-relational tables, and bodies of data structured according to the Extensible Markup Language ("XML"), such as XML documents.

Typically, clients of a database server may access data managed by the database server by issuing database statements to the database service. Typically, the database statements conform to a database language, such as a standard or proprietary form of SQL. When a database server receives a database statement, the database server executes the command. The database statements may request data from the database or request modification to data stored in the database.

Database statements may request to add a resource, delete a resource, or change the resource's place within an information hierarchy stored within a database managed by a database server. In response to a database server receiving such a statement, the database server alters link table 250 and resource table 202 accordingly. For example, a database server may receive a database statement requiring that node g be removed. In response, the database server removes link entry L7 from link table 250 and row R7 from resource table 202.

Illustrative Query

For purposes of illustration, the following query QX is received and/or computed by a database server.

```
select /*+ FIRST_ROWS(25) */   any_path
from resource_view
where CONTAINS(res, '{alter} & {table}',1) > 0 and
under_path(res, '/Root Folder/home/Oracle/Home-
B/ben.labrum/Groups') = 1
```

Query QX requests data from a view resource_view, a database view of resources. The where predicate contains two conditions based on two operators. The CONTAINS operator requires that a resource contain certain data and the under_path operator requires that the resource be within the path '/Root Folder/home/Oracle/Home-B/ben.labrum/Groups'. The under_path operator may be an operator defined by a database language, such as a standard or proprietary form of SQL.

When the database server receives query QX, it generates an execution plan. One execution plan may involve an index evaluation of the CONTAINS operator and a functional evaluation of the under_path operator. In an index evaluation, an index is examined to determine which rows satisfy a particular condition specified by an operator. The result of an index evaluation can be the identity of rows satisfying the condition e.g. the row ids of the rows. In the illustrative computation of query QX, a content index is examined to determine the row ids of rows that satisfy the condition specified by the CONTAINS operator.

In functional evaluation of an operator, each row of a set of rows is examined to determine whether a row satisfies a particular condition. The rows evaluated may be rows produced from a scan of a table or the rows produced by another evaluation, such as an index evaluation. In the case of the illustrative computation of query QX, a resulting row from the index evaluation is examined to determine whether the row falls under the path.

Link table 250 may be used to perform functional evaluations more efficiently. To illustrate how efficiency is improved, a technique of functional evaluation that is performed without use of PARENT LIDS is described and compared to a technique of functional evaluation that uses PARENT LIDS.

A functional evaluation may be performed without using the PARENT LIDS as follows. To determine whether a target node of a given row returned by the index evaluation mentioned above falls within the path, link table 250 is scanned to determine which link gentry ("child link entry") identifies the given row as a child i.e. which row in link table 250 has the given row id value in CHILD RID. Once such a child link entry is found, the child's parent link entry is read and examined, and then the parent link of child's parent link is read and examined, and so forth, to determine whether the given row is in fact under the path.

Each reading of a parent link requires a scan of link table 250 to find the parent link. Specifically, to find a parent link of a child link, link table 250 is scanned to find one or more link entries that identify the child link's parent node as a child node. i.e. a link entry that has CHILD RID equal to PARENT RID of the child link. Each scan can involve multiple reads of database data blocks into the memory buffer of a database server, even if an index is used to perform the scan.

A scan to find a parent may be performed for each link within the path to a target node or, in other words, for each path level beyond that of the node's path level. Thus, the number of scans is proportional to the depth of the child. If a child link has multiple parent links and thus falls within multiple paths, multiple scans for multiple path levels of each of multiple paths may need to be performed.

If, on the other hand, PARENT LIDS is used, the link ids therein may be used to directly access the parent link entries in the path of the target node. Thus, to determine whether a target node is within a given path, the link entries linked by values in PARENT LIDS are examined to determine whether they match the links in the given path.

Typically, using a row id to directly access a row, such as a link entry in a link table 250, involves reading just one data block. Thus, use of parent link ds in PARENT LIDS of a child link avoids the use of a scan and multiple data block reads to find a single parent link. While the number of accesses to parent link entries needed to resolve a path is proportional to the depth of the path, each access should entail just one data block read per direct access rather than multiple data block reads per scan.

Further, once a link entry is read into memory, access control data within ACCESS INFO may be examined to determine access privileges of the user on whose behalf query QX is being computed. This eliminates the need to obtain such data from other data structures and avoids the overhead inherent to accessing a different data structure.

Finally, an embodiment of the present invention has been illustrated using a relational database system and relational structures. However, the present invention is not so limited. Many of the data structures may be implemented under other paradigms. For example, in a way similar to the resource table 202, any body of records (e.g. an array, link list) may be used to represent resources and any identifiers that identify a record (i.e. object id, pointer) within the body of records may be used as a resource identifier. Likewise, any body of records may be used to represent a link entry and any identifiers that identify a record within the body may be used as parent link ids. Preferably, whatever records and record ids are used, the record ids should enable quicker access than could be had without such ids.

Hardware Overview

Figure 3:
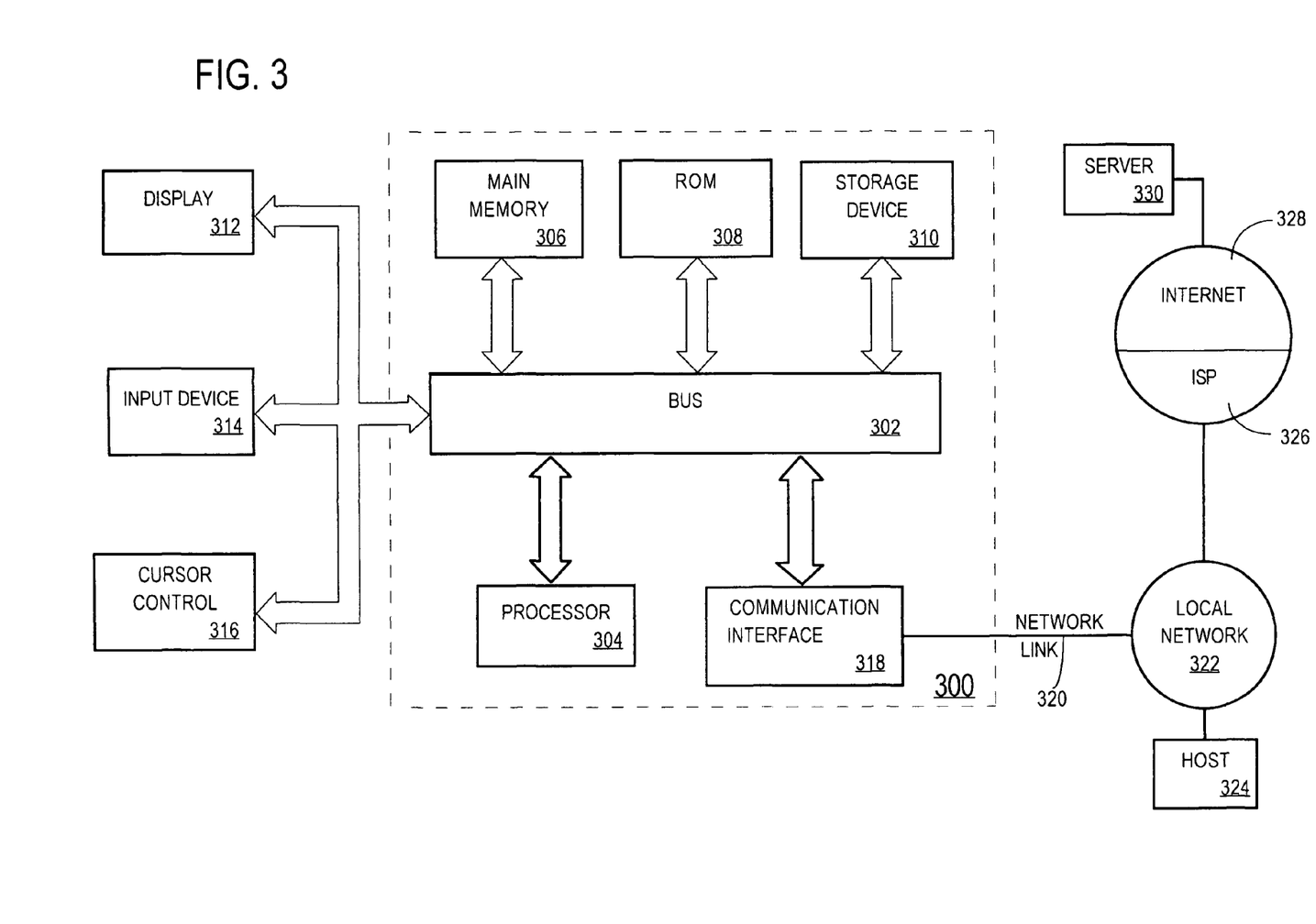
FIG. 3 is a block diagram of a computer system that may be used in an implementation of embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   a computer system generating an information hierarchy comprising a link entry hierarchy and a node hierarchy;
   wherein the link entry hierarchy is comprised of link entries, and a particular link entry in the link entry hierarchy contains a plurality of link entry identifiers;
   wherein each link entry identifier of said plurality of link entry identifiers identifies a link entry that is a parent link entry of said particular link entry, the parent link entry identified by said each link entry identifier being different than said particular link entry;

wherein the node hierarchy is comprised of nodes, and a child node of the node hierarchy is associated with said particular link entry, wherein said particular link entry defines a link from a parent node to the child node; and wherein a parent link entry of the particular link entry defines a link between a grandparent node and the parent node, wherein the grandparent node is a parent of the parent node in the node hierarchy.

2. The method of claim 1, wherein the plurality of link entry identifiers includes at least two identifiers that each identify a parent link entry.

3. The method of claim 1, wherein each link entry of said link entries includes access control data describing access privileges for accessing a node associated with said each link entry.

4. The method of claim 1, wherein each link entry of said link entries includes access control data describing access privileges for accessing the child node associated with said each link entry.

5. The method of claim 1, wherein said information hierarchy is comprised of resources stored within a database managed by a database server.

6. The method of claim 5, wherein said database server adds or removes a link entry from said link entry hierarchy in response to said database server adding or removing a resource from said node hierarchy.

7. The method of claim 1, wherein:
said link entry hierarchy is a relational table;
said link entries are rows within said relational table; and
said plurality of link entry identifiers are row ids referring to a row in said relational table.

8. A computer-implemented method for performing a resource-to-path resolution, comprising:
a computer system performing the resource-to-path resolution using
an information hierarchy comprising a link entry hierarchy and a separate node hierarchy;
wherein the link entry hierarchy is comprised of link entries, and a particular link entry in the link entry hierarchy contains a set of one or more link entry identifiers;
wherein each link entry identifier of said set of one or more link entry identifiers identifies a link entry that is a parent link entry of said particular link entry, the parent link entry identified by said each link entry identifier being different than said particular link entry;
wherein the node hierarchy is comprised of nodes, and a child node of the node hierarchy is associated with said particular link entry, wherein said particular link entry defines a link from a parent node to the child node; and
wherein a parent link entry of the particular link entry defines a link between a grandparent node and the parent node, wherein the grandparent node is a parent of the parent node in the node hierarchy; and
wherein said performing the resource-to-path resolution includes:
accessing the particular link entry, and
using the set of one or more link entry identifiers in the particular link entry to access a particular parent link entry.

9. The method of claim 8, wherein the set of one or more link entry identifiers includes at least two identifiers that each identify a parent link entry.

10. The method of claim 8, wherein each link entry of said link entries includes access control data describing access privileges for accessing a node associated with said each link entry.

11. The method of claim 8, wherein each link entry of said link entries includes access control data describing access privileges for accessing the child node associated with said each link entry.

12. The method of claim 8, wherein said performing the resource-to-path resolution includes examining access control data within either said particular link entry or said particular parent link entry to determine access control privileges.

13. The method of claim 8, wherein the resource-to-path resolution is performed to evaluate an operator referenced in a statement being computed by a database server, said statement conforming to a database language.

14. A non-transitory computer-readable storage medium that stores an:
an information hierarchy comprising a link entry hierarchy and a separate node hierarchy;
wherein the link entry hierarchy is comprised of link entries, and a particular link entry in the link entry hierarchy contains a plurality of link entry identifiers;
wherein each link entry identifier of said plurality of link entry identifiers identifies a link entry that is a parent link entry of said particular link entry, the parent link entry identified by said each link entry identifier being different than said particular link entry;
wherein the node hierarchy is comprised of nodes, and a child node of the node hierarchy is associated with said particular link entry, wherein said particular link entry defines a link from a parent node to the child node; and
wherein a parent link entry of the particular link entry defines a link between a grandparent node and the parent node, wherein the grandparent node is a parent of the parent node in the node hierarchy.

15. the non-transitory computer-readable storage medium of claim 14, wherein the one or more link entry identifiers includes at least two identifiers that each identify a parent link entry.

16. the non-transitory computer-readable storage medium of claim 14, wherein each link entry of said link entries includes access control data describing access privileges for accessing a node associated with said each link entry.

17. the non-transitory computer-readable storage medium of claim 14, wherein each link entry of said link entries includes access control data describing access privileges for accessing the child node associated with said each link entry.

18. the non-transitory computer-readable storage medium of claim 14, wherein:
said link entry hierarchy is a relational table;
said link entries are rows within said relational table; and
said one or more link entry identifiers are row ids referring to a row in said relational table.

19. A non-transitory computer-readable storage medium storing sequences of instructions, that when executed by one or more processors, cause:
performing the resource-to-path resolution using an information hierarchy comprising a link entry hierarchy and a separate node hierarchy;
wherein the link entry hierarchy is comprised of link entries, and a particular link entry in the link entry hierarchy contains a set of one or more link entry identifiers;
wherein each link entry identifier of said set of one or more link entry identifiers identifies a link entry that is a parent link entry of said particular link entry, the parent link entry identified by said each link entry identifier being different than said particular link entry;

wherein the node hierarchy is comprised of nodes, and a child node of the node hierarchy is associated with said particular link entry, wherein said particular link entry defines a link from a parent node to the child node; and wherein a parent link entry of the particular link entry defines a link between a grandparent node and the parent node, wherein the grandparent node is a parent of the parent node in the node hierarchy;

wherein said performing the resource-to-path resolution includes:

accessing the particular link entry, and using the set of one or more link entry identifiers in the particular link entry to access a particular parent link entry.

20. the non-transitory computer-readable storage medium of claim 19, wherein the set of one or more link entry identifiers includes at least two identifiers that each identify a parent link entry.

21. the non-transitory computer-readable storage medium of claim 19, wherein each link entry of said link entries includes access control data describing access privileges for accessing a node associated with said each link entry.

22. the non-transitory computer-readable storage medium of claim 19, wherein each link entry of said link entries includes access control data describing access privileges for accessing the child node associated with said each link entry.

23. The non-transitory computer-readable storage medium of claim 19, the sequences of instructions including instructions that when executed by said one or processors, cause performing the resource-to-path resolution to include examining access control data within either said particular link entry or said link entry to determine access control privileges.

24. The non-transitory computer-readable storage medium of claim 19, the sequences of instructions including instructions that when executed by said one or more processors, cause the resource-to-path resolution to be performed to evaluate an operator referenced in a statement being computed by a database server, said statement conforming to a database language.

25. A computer-implemented method for performing a resource-to-path resolution, comprising:

a computer system performing the resource-to-path resolution using an information hierarchy comprising a link entry hierarchy and a separate node hierarchy;

wherein the link entry hierarchy is comprised of link entries, and a particular link entry in the link entry hierarchy contains a plurality of link entry identifiers;

wherein each link entry identifier of said plurality of link entry identifiers identifies a link entry that is a parent link entry of said particular link entry, the parent link entry identified by said each link entry identifier being different than said particular link entry;

wherein the node hierarchy is comprised of nodes, and a child node of the node hierarchy is associated with said particular link entry, wherein said particular link entry defines a link from a parent node to the child node; and wherein a parent link entry of the particular link entry defines a link between a grandparent node and the parent node, wherein the grandparent node is a parent of the parent node in the node hierarchy;

wherein said performing the resource-to-path resolution includes:

accessing the particular link entry, and using the plurality of link entry identifiers in the particular link entry to access a parent link entry.

26. A non-transitory computer-readable storage medium storing sequences of instructions, that when executed by one or more processors, cause:

performing the resource-to-path resolution using an information hierarchy comprising a link entry hierarchy and a separate node hierarchy;

wherein the link entry hierarchy is comprised of link entries, and a particular link entry in the link entry hierarchy contains a plurality of link entry identifiers;

wherein each link entry identifier identifies a link entry that is a parent link entry of said particular link entry, the parent link entry identified by said each link entry identifier being different than said particular link entry;

wherein the node hierarchy is comprised of nodes, and a child node of the node hierarchy is associated with said particular link entry, wherein said particular link entry defines a link from a parent node to the child node; and wherein a parent link entry of the particular link entry defines a link between a grandparent node and the parent node, wherein the grandparent node is a parent of the parent node in the node hierarchy;

wherein said performing the resource-to-path resolution includes:

accessing the particular link entry, and using the plurality of link entry identifiers in the particular link entry to access a parent link entry.

27. A non-transitory computer-readable storage medium storing sequences of instructions, that when executed by one or more processors, cause:

generating an information hierarchy comprising a link entry hierarchy and a separate node hierarchy;

wherein the link entry hierarchy is comprised of link entries, and a particular link entry in the link entry hierarchy contains a plurality of link entry identifiers;

wherein each link entry identifier of said plurality of link entry identifiers identifies a link entry that is a parent link entry of said particular link entry, the parent link entry identified by said each link entry identifier being different than said particular link entry;

wherein the node hierarchy is comprised of nodes, and a child node of the node hierarchy is associated with said particular link entry, wherein said particular link entry defines a link from a parent node to the child node; and wherein a parent link entry of the particular link entry defines a link between a grandparent node and the parent node, wherein the grandparent node is a parent of the parent node in the node hierarchy.

28. the non-transitory computer-readable storage medium of claim 27, wherein the plurality of link entry identifiers includes at least two identifiers that each identify a parent link entry.

29. the non-transitory computer-readable storage medium of claim 27, wherein each link entry of said link entries includes access control data describing access privileges for accessing a node associated with said each link entry.

30. the non-transitory computer-readable storage medium of claim 27, wherein each link entry of said link entries includes access control data describing access privileges for accessing the child node associated with said each link entry.

31. the non-transitory computer-readable storage medium of claim 27, wherein said information hierarchy is comprised of resources stored within a database managed by a database server.

32. the non-transitory computer-readable storage medium of claim 31, wherein said database server is configured to add or remove a link entry from said link entry hierarchy in response to said database server adding or removing a resource from said node hierarchy.

33. the non-transitory computer-readable storage medium of claim 27, wherein:
  said link entry hierarchy is a relational table;
  said link entries are rows within said relational table; and
  said plurality of link entry identifiers are row ids referring to a row in said relational table.

\* \* \* \* \*